United States Patent [19]
Blattner et al.

[11] 3,859,439
[45] Jan. 7, 1975

[54] 2,3-DIHYDRO-5-TRIFLUOROMETHYL-1H-DIBENZO(2,3:6,7) THIEPINO (4,5-C) PYRROLES AS CNS-DEPRESSANTS

[75] Inventors: Hans Blattner; Walter Schindler, deceased, late of Basel, Switzerland by Leonhard Gysin, executor

[73] Assignee: Ciba-Geigy Corporation, Ardsley, N.Y.

[22] Filed: Sept. 5, 1972

[21] Appl. No.: 286,502

Related U.S. Application Data

[62] Division of Ser. No. 145,022, May 19, 1971, Pat. No. 3,755,357.

[30] Foreign Application Priority Data
May 26, 1970  Switzerland.......................... 7798/70

[52] U.S. Cl............................... 424/274, 260/326.9
[51] Int. Cl............................................ A61k 27/00

[58] Field of Search................... 424/274; 260/326.9

[56] References Cited
UNITED STATES PATENTS
3,755,357    8/1973    Schindler et al..................... 424/274

*Primary Examiner*—Vincent D. Turner
*Attorney, Agent, or Firm*—Joseph G. Kolodny; John J. Maitner

[57] ABSTRACT

Compounds of the class of 2,3-dihydro-5-(trifluoromethyl)-1H-dibenzo[2,3:6,7]thiepino[4,5-c]pyrrole and its 2-alkyl-derivatives and pharmaceutically acceptable acid addition salts have a depressant effect on the central nervous system, they can be prepared from 10,11-bis-(bromomethyl)-2-(trifluoromethyl)-dibenzo[b,f]thiepin and a primary amine; the compounds are active ingredients of pharmaceutical compositions.

8 Claims, No Drawings

2,3-DIHYDRO-5-TRIFLUOROMETHYL-1H-DIBENZO (2,3:6,7) THIEPINO (4,5-C) PYRROLES AS CNS-DEPRESSANTS

This is a division of application Ser. No. 145,022, filed May 19, 1971, now U.S. Pat. No. 3,755,357.

DETAILED DESCRIPTION

The present invention relates to new thiepin derivatives, to processes for their production, to medicaments containing the new compounds, and to the use thereof.

More particularly, the present invention relates to compounds of the formula I:

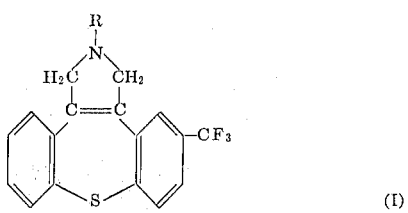

(I)

wherein
R is hydrogen or an unbranched alkyl group having 1–6 carbon atoms or the isopropyl group or the allyl group,
and the pharmaceutically acceptable acid addition salts thereof.

In the compounds of formula I R as an alkyl group having at most 6 carbon atoms is e.g. the methyl, ethyl, propyl, isopropyl, butyl, isobutyl, sec. butyl, pentyl, isopentyl or the hexyl group.

Preferred members of this class are:
2-methyl-2,3-dihydro-5-(trifluoromethyl)-1H-dibenzo [2,3:6,7]thiepino[4,5-c]pyrrole
2-ethyl-2,3-dihydro-5-(trifluoromethyl)-1H-dibenzo [2,3:6,7]thiepino[4,5-c]pyrrole
2-propyl-2,3-dihydro-5-(trifluoromethyl)-1H-dibenzo [2,3:6,7]thiepino[4,5-c]pyrrole
2-isopropyl-2,3-dihydro-5-(trifluoromethyl)-1H-dibenzo [2,3:6,7]thiepino[4,5-c]pyrrole
2-butyl-2,3-dihydro-5-(trifluoromethyl)-1H-dibenzo [2,3:6,7]thiepino]4,5-c]pyrrole
2-allyl-2,3-dihydro-5-(trifluoromethyl)-1H-dibenzo [2,3:6,7]thiepino[4,5-c]pyrrole
and the pharmaceutically acceptable acid addition salts thereof.

Compounds of the formula I and the pharmaceutically acceptable acid addition salts thereof have valuable pharmacological properties. They exert in particular when administered orally, rectally, and parenterally a central nervous system-depressant action, e.g. they reduce motility, potentiate the action of analgesics and anaesthetics, antagonise the action of amphetamine, have an anti-emetic and serotonin-antagonistic action in the case of the "test de la traction", and lower the body temperature. Furthermore, they have an antihistamine action. These properties, are determined by selected standard tests [cp. R. Domenjoz and W. Theobald, Arch-Int. Pharmacodyn. 120, 450 (1959), G. Raynaud, Produits Pharm. 16, 99 (1961), and W. Theobald and R. Domenjoz, Arzneimittelforsch. 8, 18 (1958)].

Thus, merely by illustration, it is demonstrated, that 2-ethyl-2,3-dihydro-5-(trifluoromethyl)-1H-dibenzo [2,3:6,7]thiepino[4,5-c]pyrrole in the form of the methane sulphonate salt effects a 50% decrease of orientation — motility after intraperitoneal administration on mice of 0.26 mg/kg of the compound.

The same compound subcutaneously administered in a dose of 5 mg/kg to mice, which had been anaesthetised by intraperitoneal administration of 40 mg/kg of the short-acting anaesthetic N,N-diethyl-2-methoxy-4-allyl-phenoxyacetic acid amide potentiates i.e. prolongs the effect of the anaesthetic to a significant extent.

Similar results are found with 2-methyl-2,3-dihydro-5-(trifluoromethyl)-1H-dibenzo[2,3:6,7]thiepino[4,5-c]pyrrole and the 2-butyl-2,3-dihydro-5-(trifluoromethyl)-1H-dibenzo [2,3:6,7]thiepino[4,5-c]pyrrole, both compounds in the form of the respective hydrochloride salts.

Although the methane sulphonate and the hydrochloride salts are preferred, also other pharmaceutically acceptable acid addition salts can be used.

The pharmacological properties of the compounds of the present invention render them suitable for the treatment of states of tension and agitation as central nervous system depressants.

The compounds of the general formula I are produced according to the invention by reacting the compound of formula II:

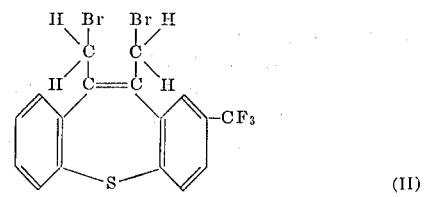

(II)

with a compound of the general formula III:

(III)

wherein R has the meaning given under formula I; and, optionally, converting the obtained reaction product, with an inorganic or organic acid, into an addition salt.

The bis-bromomethyl compound of formula II is reacted with the free bases of the general formula III in the presence of a solvent. Suitable solvents are such ones which are inert under the reaction conditions, e.g. hydrocarbons such as benzene or toluene, halogenated hydrocarbons such as chloroform, lower alkanols such as methanol or ethanol, ethereal liquids such as ether or dioxane, as well as lower alkanones such as acetone, methyl ethyl ketone, or diethyl ketone.

In the reaction according to the invention of one molar equivalent of bis-bromomethyl compound with one molar equivalent of free bases, two molar equivalents of hydrogen bromide are eliminated. The hydrogen bromide is bound to excess base of the general formula III.

The starting material: 10,11-bis-(bromomethyl)-2-(trifluoromethyl)-dibenzo[b,f]thiepin, which corresponds to formula II, can be produced, for example, by the following process: Starting with [o-(α,α,α-trifluorop-tolylthio)-phenyl]-acetic acid [cp. K. Pelz and M. Protiva, Collect. Czechoslov. Chem. Communications 34, 3936 (1969)], this is firstly converted into its ethyl ester, and this then condensed with diethyl carbonate, in the presence of sodium, to [o-($\alpha,\alpha,\alpha$-trifluoro-p-tolylthio)-phenyl]-malonic acid diethyl ester. The sodium compound of this is reacted with methyl iodide, and the obtained disubstituted malonic acid diethyl ester hydrolysed, with simultaneous decarboxylation, to give o-($\alpha,\alpha,\alpha$-trifluoro-p-tolylthio)-hydratropic acid. This acid yields, on reaction with hydrofluoric acid at room temperature, 11-methyl-8-(trifluoromethyl)-dibenzo[b,f]thiepin-10(11H)-one, which is reacted with methyl magnesium iodide to obtain 10,11-dihydro-10,11-dimethyl-8-(trifluoromethyl)-dibenzo[b,f]thiepin-10-ol. From this is obtained, on the elimination of water by heating in vacuo, mainly 10,11-dihydro-10-methyl-11-methylene-2-trifluoromethyl-dibenzo[b,f]thiepin, which, by boiling with ethanolic potassium hydroxide solution, is rearranged into 10,11-dimethyl-2-(trifluoromethyl)-dibenzo[b,f]thiepin. Finally, this dimethyl compound is brominated with N-bromosuccinimide, in the presence of dibenzoylperoxide, to 10,11-bis-(bromomethyl)-2-(trifluoromethyl)-dibenzo[b,f]thiepin of formula II.

A second process, according to the invention for the production of compounds of general formula I wherein R represents hydrogen comprises hydrolysing a compound of the general formula IV:

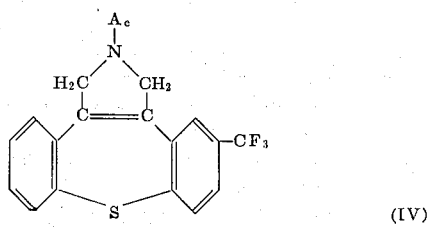

wherein

Ac represents the acyl radical of an organic acid; and, if desired, converting the obtained compound into a pharmaceutically acceptable acid addition salt.

In the starting materials of the general formula IV, Ac is, in particular, the acyl radical of cyanic acid, of chloroformic acid, of a carbonic acid semi-ester or thiocarbonic acid semi-ester, of a lower alkanecarboxylic acid or of an arenecarboxylic acid. Mentioned as examples of acyl radicals Ac are: the cyano, chlorocarbonyl, methoxycarbonyl, ethoxycarbonyl, tert. butoxycarbonyl, phenoxycarbonyl, benzyloxycarbonyl, methoxythiocarbonyl, methylthio-thiocarbonyl, acetyl, and benzoyl groups.

The hydrolysis of compounds of general formula IV is effected, for example, by several hours' heating of such compounds in an alkanolic or aqueous/alkanolic alkali hydroxide solution, e.g. by boiling in a mixture of potassium or sodium hydroxide with ethanol or methanol and a little water. Instead of lower alkanols, it is also possible to use other solvents containing hydroxyl groups, such as ethylene glycol and lower monoalkyl ethers thereof. Furthermore, hydrolysis may be effected, particularly of compounds of the general formula IV wherein Ac denotes CN, the acyl radical of cyanic acid, also by heating with a mineral acid in an organic/aqueous or aqueous medium, e.g. by several hours' boiling in a mixture of 85% phosphoric acid and formic acid, or by several hours' heating in 48% hydrobromic acid to ca. 60°–70°C.

The starting materials of the general formula IV are, in their turn, produced, e.g. from compounds of the general formula I wherein R represents a lower alkyl group, especially the methyl group, or the allyl group; or from 2-benzyl-2,3-dihydro-5-(trifluoromethyl)-1H-dibenzo[2,3:6,7]thiepino[4,5-c]pyrrole producible analogously to the compounds of the general formula I, by allowing to act on the stated compounds, at room temperature or at elevated temperature, an organic acyl halide, e.g. a cyanogen halide, particularly cyanogen bromide, also phosgene, a chloroformic acid alkyl ester, the chloroformic acid phenyl ester or benzyl ester, the chloride or bromide of a lower alkanoic acid or benzoic acid, especially acetyl chloride, acetyl bromide, or benzoyl chloride, whereby occurs, according to the von Braun reaction, the desired acylation with liberation of the alkyl or allyl halide corresponding to the group R, or of a benzyl halide. The reaction is carried out in an inert organic solvent such as, e.g. chloroform or benzene, or, optionally, also in the excess of an acyl halide suitable as reaction medium.

The compounds of the general formula I obtained by the process according to the invention are, optionally, subsequently converted, in the usual manner, into their pharmaceutically acceptable acid addition salts. For example, to a solution of a compound of the general formula I in an organic solvent is added the acid desired as the salt component, or a solution of the acid. Preferably chosen for the reaction are organic solvents in which the formed salt is difficultly soluble, so that it can be separated by filtration. Such solvents are, e.g. methanol, acetone, methyl ethyl ketone, acetone/ethanol, methanol/ether, or ethanol/ether.

For use as medicaments it is possible to use, instead of free bases, pharmaceutically acceptable acid addition salts, i.e. salts with such acids of which the anions are not toxic in the case of the dosages in question. Furthermore, it is of advantage if the salts to be used as medicaments crystallise well and are not, or only slightly, hygroscopic. For salt formation with compounds of the general formula I it is possible to use, e.g. hydrochloric acid, hydrobromic acid, sulphuric acid, phosphoric acid, methanesulphonic acid, ethanesulphonic acid, $\beta$-hydroxyethanesulphonic acid, acetic acid, malic acid, tartaric acid, citric acid, lactic acid, oxalic acid, succinic acid, fumaric acid, maleic acid, benzoic acid, salicyclic acid, phenylacetic acid, mandelic acid and embonic acid.

As already mentioned, the new active substances are administered orally, rectally, or parenterally. The dosage depends on the manner of administration, the species, the age, and on the individual condition. The daily dosages of the free bases or of pharmaceutically acceptable salts thereof vary between 0.1 mg/kg and 10 mg/kg for warm-blooded animals. Suitable dosage units, such as dragées, tablets, suppositories or ampoules, preferably contain 2–100 mg of an active substance according to the invention.

Dosage units for oral administration preferably contain as active substance between 1 and 90% of a compound of the general formula I, or of a pharmaceutically acceptable salt of such a compound. They are produced by combining the active substance, e.g. with solid pulverulent carriers such as lactose, saccharose, sorbitol, mannitol; starches such as potato starch, maize starch or amylopectin, also laminaria powder or citrus pulp powder; cellulose derivatives or gelatine, optionally with the addition of lubricants such as magnesium or calcium stearate, or polyethylene glycols, to form tablets or dragée cores. The dragée cores are coated, e.g. with conc. sugar solutions which may also contain, e.g. gum arabic, talcum and/or titanium dioxide; or they are coated with a lacquer dissolved in readily volatile organic solvents or mixtures of solvents. Dyestuffs may be added to these coatings, e.g. for identification of the varying dosages of active substance.

Further dosage units suitable for oral administration are hard gelatine capsules, as well as soft closed capsules made from gelatine and a softener such as gylcerin. The hard capsules contain the active substance preferably as a granulate, e.g. in admixture with fillers such as maize starch, and/or lubricants such as talcum or magnesium stearate, and, optionally, stabilisers such as sodium metabisulphite ($Na_2S_2O_5$), or ascorbic acid. In soft capsules, the active substance is preferably dissolved or suspended in suitable liquids such as liquid polyethylene glycols, whereby likewise stabilisers may be added.

Suitable dosage units for rectal administration are, e.g. suppositories consisting of a combination of an active substance with a fatty base. Also suitable are gelatine rectal capsules containing a combination of the active substance with polyethylene glycol.

Ampoules for parenteral administration, especially intramuscular administration, preferably contain as active substance a water-soluble salt in a concentration of preferably 0.5–5%, optionally together with suitable stabilisers and buffer substances, in aqueous solution.

The following prescriptions further illustrate the production of tablets, dragées, capsules, suppositories and ampoules:

a. An amount of 250 g of 2-ethyl-2,3-dihydro-5-(trifluoromethy)-1H-dibenzo[3,4:6,7]thiepino[4,5-c]pyrrolemethane sulphonate is mixed with 175.80 g of lactose and 169.70 g of potato starch; the mixture is then moistened with an alcoholic solution of 10 g of stearic acid, and granulated through a sieve. After drying of the granulate, 160 g of potato starch, 200 g of talcum, 2.50 g of magnesium stearate, and 32 g of colloidal silicon dioxide are mixed in; the mixture is then pressed to form 10,000 tablets each weighing 100 mg and each containing 25 mg of active substance. If required, the tablets can be provided with grooves for a more precise adjustment of the dosage amount.

b. A granulate is produced from 100 g of 2-ethyl-2,3-dihydro-5-(trifluoromethyl)-1H-dibenzo[3,4:6,7]-thiepino[4,5-c]pyrrole methane sulphonate, 175.90 g of lactose, and the alcoholic solution of 10 g of stearic acid; after drying, the granulate is mixed with 56.60 g of colloidal silicon dioxide, 165 g of talcum, 20 g of potato starch, and 2.50 g of magnesium stearate; and the mixture is then pressed to form 10,000 dragée cores. These are subsequently coated with a concentrated syrup made from 502.28 g of crystallised saccharose, 6 g of shellac, 10 g of gum arabic, 0.22 g of dyestuff, and 1.5 g of titanium dioxide, and then dried. The obtained dragees each weigh 105 mg and each contain 10 mg of active substance c. To produce 1000 capsules each containing 25 mg of active substance, 25 g of 2-ethyl-2,3-dihydro-5-(trifluoromethyl)-1H-dibenzo[3,4:6,7]thiepino[4,5-c]pyrrolemethane sulphonate are mixed with 248 g of lactose; the mixture is evenly moistened with an aqueous solution of 2 g of gelatine, and then granulated through a suitable sieve (e.g. Sieve III according to Ph.Helv. V). The granulate is mixed with 10 g of dried maize starch and 15 g of talcum, and the mixture evenly filled into 1,000 hard gelatine capsules, Size 1.

d. A suppository foundation substance is prepared from 2.5 g of 2-ethyl-2,3-dihydro-5-(trifluoromethyl)-1H-dibenzo[3,4:6,7]thiepino[4,5-c]pyrrolemethane sulphonate and 167.5 g of adeps solidus; it is then used to fill 100 suppositories each containing 25 mg of active substance.

e. A solution of 25 g of 2-ethyl-2,3-dihydro-5-(trifluoromethyl)-1H-dibenzo[3,4:6,7]thiepino[4,5-c]pyrrolemethane sulphonate in one litre of water is filled unto 1,000 ampoules, and then sterilised. An ampoule contains a 2.5% solution of 25 mg of active substance.

It is also possible to use, as active substance for tablets, dragées, capsules, suppositories, and ampoules, the same amount of the following compounds:

2,3-Dihydro-2-methyl-5-(trifluoromethyl)-1H-dibenzo [3,4:6,7]thiepino[4,5-c]pyrrole hydrochloride.

2,3-Dihydro-2-propyl-5-(trifluoromethyl)-1H-dibenzo [3,4:6,7]thiepino[4,5-c pyrrole hydrochloride.

2-Butyl-2,3-dihydro-5-(trifluoromethyl)-1H-dibenzo [3,4:6,7]thiepino[4,5-c]pyrrole hydrochloride.

The following example further illustrates the production of the new compounds of the general formula I and of intermediate products not hitherto described; it does not, however, in any way limit the scope of the invention. The temperatures are given in degrees Centigrade.

EXAMPLE 1 a. An amount of 23.2 g (0.05 mol) of 10,11-bis-(bromomethyl)-2-(trifluoromethyl)-dibenzo[b,f]thiepin is dissolved in 100 ml of abs. benzene. This solution is added dropwise at 40°, within one hour, to a solution of 40 g (ca. 0.9 mol) of ethylamine in 200 ml of methanol. The reaction mixture is stirred for a further 2 hours at 50°, and the solvent and excess ethylamine are subsequently distilled off. To the residue are added 100 ml of water, and the obtained suspension is extracted with ether. The ethereal solution is washed with water, dried over potassium carbonate, and concentrated in vacuo to dryness. The residue is recrystallised from ethanol, and yields pure 2-ethyl-2,3-dihydro-5-(trifluoromethyl)-1H-dibenzo[2,3:6,7]-thiepino[4,5-c]pyrrole, M.P. 104°–106°.

An amount of 8.68 g (0.025 mol) of the obtained base is dissolved in 25 ml of absolute acetone; to the solution are then added 2.40 g (0.025 mol) of methanesulphonic acid, whereupon the methane sulphonate crystallises out. The 2-ethyl-2,3-dihydro-5-(trifluoromethyl)-1H-dibenzo[2,3:6,7]thiepino[4,5-c]pyrrolemethane sulphonate is recrystallised from ethanol; M.P. 230°–232°. Starting with the same amount of 10,11-bis-(bromomethyl)-2-(trifluoromethyl)-dibenzo[b,f]thiepin the following compounds are produced in the analogous manner, using:

$a_2$. 35.0 g (1.1 mol) of methylamine the 2-methyl-2,3-dihydro-5-(trifluoromethyl)-1H-dibenzo[2,3:6,7]thiepino [4,5-c]pyrrole; M.P. 70°–72°.

Hydrochloride: M.P. 240°–242°.

a₃. 65.0 g (1.1 mol) of n-propylamine the 2-n-propyl-2,3-dihydro-5-(trifluoromethyl)-1H-dibenzo [2,3:6,7]thiepino[4,5-c]pyrrole, M.P. 102°.

To a solution of the base obtained in acetone, an ethereal solution of hydrochloric acid is added, whereby the hydrochloride salt precipitates, which is recrystallized from ethanol/ethyl acetate. The pure hydrochloride salt is obtained as a one-third hydrate.

M.P. 212°–214°.

a₄. 65.0 g (1.1 mol) of isopropylamine the 2-isopropyl-2,3-dihydro-5-(trifluoromethyl)-1H-dibenzo[2,3:6,7]pyrrole as an oily product, which is converted to the hydrochloride salt by means of ethereal hydrochloric acid solution. The pure hydrochloride salt is obtained by recrystallization from acetone/ether;

M.P. 175°–178°.

a₅. 65.0 g (0.9 mol) of n-butylamine the 2-n-butyl-2,3-dihydro-5-(trifluoromethyl)-1H-dibenzo[2,3:6,7]thiepino[4,5-c]pyrrole as an oily product.

M.P. of the hydrochloride salt: 178°–180°.

a₆. 55.0 g (0.9 mol) of allylamine the 2-allyl-2,3-dihydro-5-(trifluoromethyl)-1H-dibenzo[2,3:6,7]thiepino [4,5-c]pyrrole, M.P. 87°–89°;

M.P. of the hydrochloride salt: 185°–190°.

The 10,11-bis-(bromomethyl)-2-(trifluoromethyl)-dibenzo[b,f]thiepin required as starting material is produced as follows:

b. 224.0 g (0.725 mol) of [o-($\alpha,\alpha,\alpha$-trifluoro-p-tolylthio)-phenyl[-acetic acid are dissolved in 2,000 ml of absolute ethanol, and to the solution are added 100 ml of 6,5-n ethanolic hydrochloric acid. The reaction mixture is refluxed for 5 hours, the solvent then evaporated off in vacuo, and the oily residue taken up in ether. The ethereal solution is extracted with water, saturated sodium bicarbonate solution, and again with water. The ethereal phase is dried over magnesium sulphate, the solvent evaporated off in vacuo, and the oily residue distilled in high vacuo. The pure[o-($\alpha,\alpha,\alpha$-trifluoro-p-tolylthio)-phenyl]-acetic acid ethyl ester boils under 0.01 Torr at 132°–135°; $n_D^{20}$ = 1.5415. Yield 235 g = 95% of the theoretical value.

c. An amount of 234 g (0.69 mol) of the ester obtained according to b is dissolved in 200 ml of diethyl carbonate; the solution is then added dropwise at 100°, in the course of 20 minutes, to a solution of 16.3 g (0.71 mol) of sodium in 800 ml of diethyl carbonate. The reaction mixture is stirred for one hour at 100°, and the liberated ethanol subsequently distilled off (maximum internal temperature 125°). The reaction mixture is then cooled to room temperature, poured on to one litre of ice water, and acidified with 2-n hydrochloric acid to pH 3. The organic phase is subsequently taken up in ether, washed neutral with water and, after drying with magnesium sulphate, concentrated in vacuo. The obtained residue (287 g) consists of [o-($\alpha,\alpha,\alpha$-trifluoro-p-tolylthio)-phenyl]-malonic acid diethyl ester, which is further used as crude product.

d. An amount of 285 g (0.69 mol) of crude [o-($\alpha,\alpha,\alpha$-trifluoro-p-tolylthio)-phenyl]-malonic acid diethyl ester is dissolved in 800 ml of absolute ethanol; the solution is then added dropwise at room temperature, in the course of 30 minutes, to a solution of 15.9 g (0.69 mol) of sodium in 800 ml of absolute ethanol. The reaction mixture is subsequently stirred for one hour at room temperature. To the mixture are then added dropwise, within 30 minutes, 147.0 g (1.03 mol) of methyl iodide. After completed addition of the methyl iodide, the reaction mixture is refluxed for 6 hours. To the reaction mixture containing the methyl-[o-($\alpha,\alpha,\alpha$-trifluoro-p-tolylthio)-phenyl]-malonic acid diethyl ester is then added dropwise at reflux temperature, in the course of 30 minutes, a solution of 84 g (1.50 mol) of potassium hydroxide in 690 ml of water. The mixture is refluxed for 20 hours, and the ethanol subsequently distilled off, within 3 hours, from the reaction mixture. The residue is cooled, poured on to 2 litres of ice water, and extracted three times with benzene. The alkaline aqueous phase is acidified with concentrated hydrochloric acid (pH = 1), and extracted twice with ether. The ethereal phases are washed with water, dried over magnesium sulphate, and concentrated in vacuo. The obtained residue is distilled in high vacuum. The pure o-($\alpha,\alpha,\alpha$-trifluoro-p-tolylthio)-hydratropic acid boils at 155°–160°/0.01 Torr. Yield 197.5 g = 87.5% of the theoretical value.

e. An amount of 187 g (0.574 mol) of o-($\alpha,\alpha,\alpha$-trifluoro-p-tolylthio)-hydratropic acid is added to ca. 700 ml of anhydrous hydrofluoric acid and dissolved. The mixture is stirred for 12 hours at room temperature, and the hydrofluoric acid subsequently evaporated off at 25°–30°. The obtained residue is dissolved in benzene, and extracted with water and 2-n sodium carbonate solution. The organic phase is dried over magnesium sulphate, and concentrated in vacuo to dryness. The obtained residue is recrystallised from pentane. The pure 11-methyl-8-(trifluoromethyl)-dibenzo[b,f]thiepin-10(11H)-one melts at 107°–108°. Yield 57 g = 32% of the theoretical value.

f. An amount of 57 g (0.185 mol) of 11-methyl-8-(trifluoromethyl)-dibenzo[b,f]thiepin-10(11H)-one is dissolved in 200 ml of absolute benzene; the solution is then added dropwise at −5° to 0°, in the course of 2 hours, to a freshly prepared Grignard solution consisting of 8.8 g (0.37 mol) of magnesium and 52.5 g (0.37 mol) of methyl iodide in 500 ml of ether. The mixture is subsequently stirred for one hour at room temperature and for 12 hours at 45°–50°. After cooling is completed, the contents of the flask are poured on to a solution of 100 g of ammonium chloride in one litre of ice water, and extracted with ether. The ethereal phases are washed with water, dried over magnesium sulphate, and concentrated in vacuo. The obtained crude 10,11-dihydro-10,11-dimethyl-8-(trifluoromethyl)-dibenzo[b,f]thiepin-10-ol is a viscous oil. Crude yield = 62 g, ca. 100% of the theoretical value.

g. An amount of 50.8 g (0.157 mol) of crude 10,11-dihydro-10,11-dimethyl-8-(trifluoromethyl)-dibenzo[b,f]thiepin-10-ol is heated for 6 hours in vacuo to 190°. The crude product is dissolved in ether, and purified by chromatography on 700 g of neutral silica gel [grain size 0.05–0.2 mm (Merck)] with elution with petroleum ether. The eluted product (42.5 g) is dissolved in 400 ml of absolute ethanol and, after addition of 80 g of potassium hydroxide, refluxed for 12 hours. The ethanol is to a great extent then evaporated off in vacuo and the residue extracted by shaking with ether and water. The ethereal phases are washed with water until neutral, dried over magnesium sulphate, and the solvent is evaporated off in vacuo. The obtained oily residue is distilled in high vacuum. The pure 10,11-dimethyl-2-(trifluoromethyl)-dibenzo[b,f]thiepin boils at 125°–130°/0.01 Torr, and has a M.P. of 63°–65°. Yield 34.9 g = 72% of the theoretical value.

h. An amount of 9.81 g (0.03 mol) of 10,11-dimethyl-2-(trifluoromethyl)-dibenzo[b,f]thiepin is dissolved in 100 ml of absolute carbon tetrachloride. To this solution are added 11.2 g (0.063 mol) of N-bromosuccinimide and 0.1 g of dibenzoyl peroxide. With stirring and exposure to a UV-lamp, the mixture is heated to boiling. The reaction is completed after 30 minutes (the succinimide floats on top of the carbon tetrachloride), and the mixture is cooled to room temperature. The succinimide is filtered off, washed out with carbon tetrachloride, and the filtrate extracted by being shaken with dilute sodium bicarbonate solutions. The organic phases are thereupon washed with water until neutral, dried over magnesium sulphate, and the solvent is evaporated off in vacuo. The residue is recrystallised from ether/petroleum ether. The pure 10,11-bis-(bromomethyl)-2-(trifluoromethyl)-dibenzo[b,f]thiepin melts at 144°–146°. Yield 13.2 g = 95% of the theoretical value.

EXAMPLE 2 a. 3.9 g (0.01 mol) of crude 2-ethoxycarbonyl-2,3-dihydro-5-(trifluoromethyl)-1H-dibenzo[2,3:6,7]-thiepino[4,5-c]pyrrole are refluxed with y mixture of 7 ml of 48% aqueous hydrobromic acid and 21 ml of acetic acid for 4 hours followed by evaporating the reaction mixture. The residue is dissolved in 100 ml of water and the solution obtained is rendered alcaline with conc.sodium hydroxide solution followed by extracting with an ether/methylenechloride solution (2:1).

The organic layer is extracted with three portions of each 20 ml of an 1-n. aqueous methane sulphonic acid solution, the combined acid axtracts are rendered alcaline with conc.sodium hydroxide solution and the whole mixture is extracted with an ether/methylenechloride solution (2:1). The organic layer is washed with water, dried over magnesium sulphate and evaporated to dryness in vacuo. The crude base obtained is dissolved in acetone and converted to the hydrochloride by reacting with an ethereal hydrochloric acid solution. The precipitate is recrystallized from an ether/ethanol mixture, whereby the pure 2,3-dihydro-5-(trifluoromethyl)-1H-dibenzo[2,3:6,7]thiepino[4,5-c]pyrrole-hydrochloride is recovered. M.P. 245°–247°.

The 2-ethoxycarbonyl-2,3-dihydro-5-(trifluoromethyl)-1H-dibenzo[2,3:6,7]thiepino[4,5-c]pyrrole required as starting material is produced as follows:

b. 4.30 g (0.012 mol) of 2-allyl-2,3-dihydro-5-(trifluoromethyl)-1H-dibenzo[2,3:6,7]thiepino[4,5-c]pyrrole are dissolved in 20 ml of absolute benzene. To this solution a solution of 1.5 g (0.014 mol) of ethylchloroformate in 20 ml of absolute benzene is added dropwise in the course of 90 minutes at reflux temperature, followed by refluxing the reaction mixture for one further hour. After cooling the mixture is poored into 100 ml of ice-water, the organic layer is separated, washed with 20 ml of 2-n. hydrochloric acid followed by washing with water until neutral, dried over magnesium sulphate and evaporated to dryness in vacuo, whereby the oily 2-ethoxycarbonyl-2,3-dihydro-5-(trifluoromethyl)-1H-dibenzo[2,3:6,7]thiepino[4,5-c]pyrrole is obtained.

What we claim is:

1. A method of producing a central-nervous system depressant effect on warm-blooded animals comprising the oral, rectal, or parenteral administration thereto of a central-nervous system depressantly effective amount of a compound of the formula I

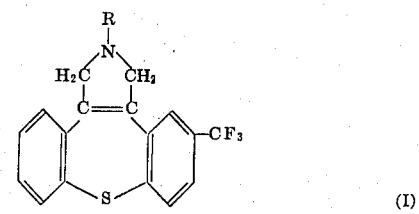

(I)

wherein R is hydrogen or an unbranched alkyl group having 1–6 carbon atoms, the isopropyl group or the allyl group or a pharmaceutically acceptable acid-addition salt thereof.

2. A therapeutic preparation comprising a central-nervous system depressantly effective amount of a compound according to claim 1 together with a pharmaceutical excipient.

3. The therapeutic preparation as claimed in claim 2, wherein the compound is 2-methyl-2,3-dihydro-5-(trifluoromethy)-1H-dibenzo[2,3:6,7]thiepino[4,5-c]pyrrole or a pharmaceutically acceptable acid addition salt thereof.

4. The therapeutic preparation as claimed in claim 2, wherein the compound is 2-ethyl-2,3-dihydro-5-(trifluoromethyl)-1H-dibenzo[2,3:6,7]thiepino[4,5-c]pyrrole or a pharmaceutically acceptable acid addition salt thereof.

5. The therapeutic preparation as claimed in claim 2, wherein the compound is 2-propyl-2,3-dihydro-5-(trifluoromethyl)-1H-dibenzo[2,3:6,7]thiepino[4,5-c]pyrrole or a pharmaceutically acceptable acid addition salt thereof.

6. The therapeutic preparation as claimed in claim 2, wherein the compound is 2-isopropyl-2,3-dihydro-5-(trifluoromethyl)-1H-dibenzo[2,3:6,7]thiepino[4,5-c]pyrrole or a pharmaceutically acceptable acid addition salt thereof.

7. The therapeutic preparation as claimed in claim 2, wherein the compound is 2-butyl-2,3-dihydro-5-(trifluoromethyl)-1H-dibenzo[2,3:6,7]thiepino[4,5-c]pyrrole or a pharmaceutically acceptable acid addition salt thereof.

8. The therapeutic preparation as claimed in claim 2, wherein the compound is 2-allyl-2,3-dihydro-5-(trifluoromethyl)-1H-dibenzo[2,3:6,7]thiepino[4,5-c]pyrrole or a pharmaceutically acceptable acid addition salt thereof.

* * * * *